United States Patent
Fujisaki et al.

(10) Patent No.: US 6,191,813 B1
(45) Date of Patent: *Feb. 20, 2001

(54) IMAGE STABILIZING DEVICE OPERABLE RESPONSIVELY TO A STATE OF OPTICAL APPARATUS USING THE SAME

(75) Inventors: Tatsuo Fujisaki, Yokohama; Isao Nakazawa, Zama; Yasuhiko Shiomi, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/934,871

(22) Filed: Sep. 22, 1997

Related U.S. Application Data

(63) Continuation of application No. 08/820,698, filed on Mar. 18, 1997, now abandoned, which is a continuation of application No. 08/489,688, filed on Jun. 12, 1995, now abandoned, which is a continuation of application No. 08/121,445, filed on Sep. 14, 1993, now abandoned, which is a continuation of application No. 07/682,008, filed on Apr. 8, 1991, now abandoned.

(30) Foreign Application Priority Data

Apr. 11, 1990 (JP) ........................................ 2-94076
May 16, 1990 (JP) ...................................... 2-127885

(51) Int. Cl.⁷ .......................... H04N 5/225; H04N 5/232; G02B 27/64

(52) U.S. Cl. ........................... 348/208; 348/352; 359/554
(58) Field of Search .................................. 348/208, 345, 348/348, 352; 359/554, 555, 556, 557; 396/7, 13, 52, 55, 54; H04N 5/225, 5/232, 5/228

(56) References Cited

U.S. PATENT DOCUMENTS

| | | | |
|---|---|---|---|
| 4,503,325 | * 3/1985 | Araki | 354/402 |
| 4,713,697 | * 12/1987 | Gotou et al. | 358/222 |
| 4,856,882 | * 8/1989 | Oshima et al. | 348/208 |
| 4,862,277 | * 8/1989 | Iwaibana | 348/208 |
| 4,965,619 | 10/1990 | Shikaumi et al. | 354/410 |
| 5,012,270 | * 4/1991 | Sekine et al. | 359/554 X |
| 5,101,230 | 3/1992 | Shikaumi et al. | 354/430 |

FOREIGN PATENT DOCUMENTS 61-242178 * 10/1986 (JP) .............................. H04N/5/232

* cited by examiner

Primary Examiner—John W. Miller
(74) Attorney, Agent, or Firm—Robin, Blecker & Daley

(57) ABSTRACT

An image stabilizing device removably mountable on a camera or other optical apparatus includes an image stabilizer for accomplishing image stabilization of the camera, a detector for detecting the operative state of the camera, and a controller responsive to the detector to control the operation of said image stabilizer. The detector detects the presence or absence of an information signal and the controller acts diversely dependent on the detections.

25 Claims, 12 Drawing Sheets

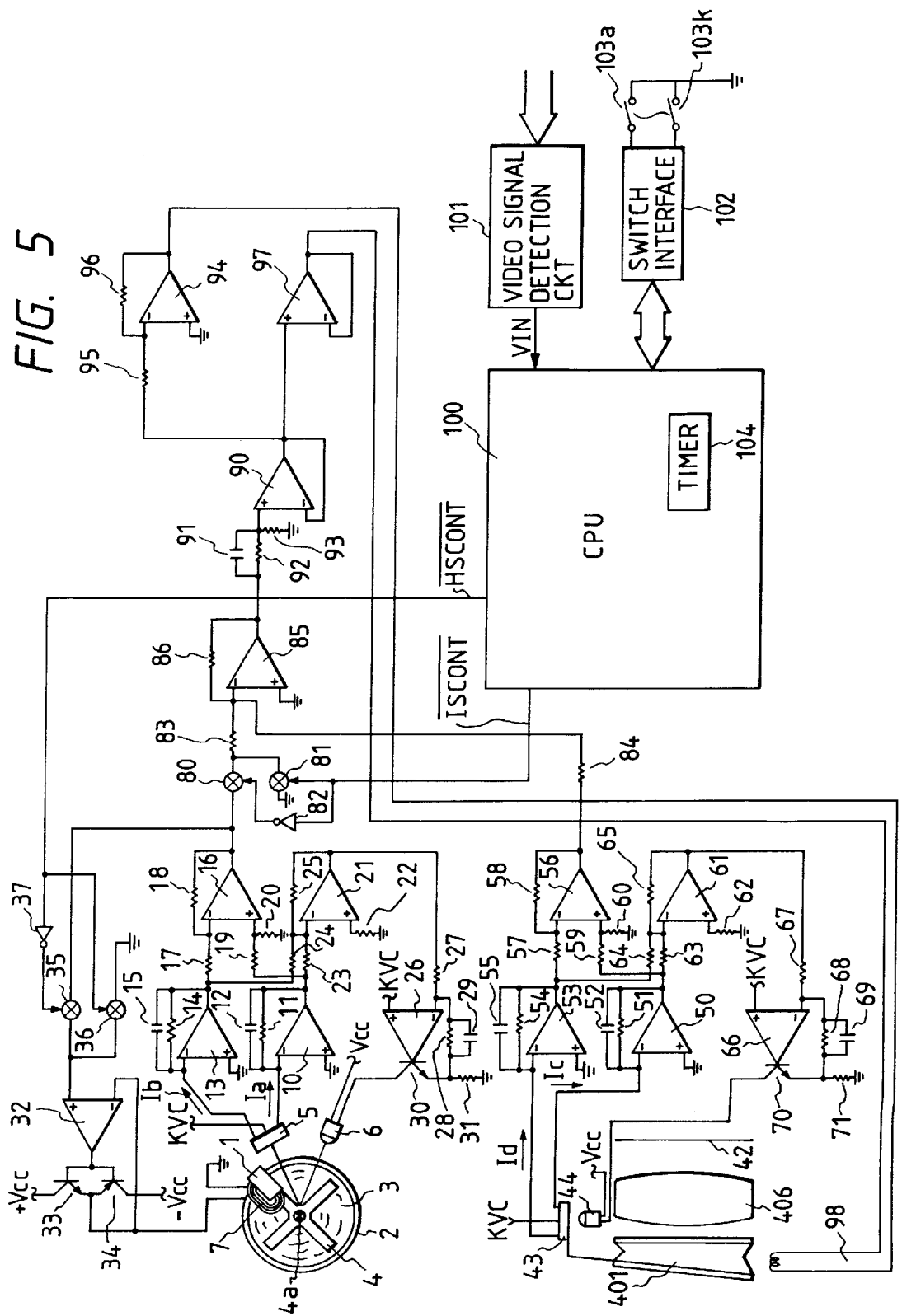

IMAGE STABILIZING DEVICE OPERABLE RESPONSIVELY TO A STATE OF OPTICAL APPARATUS USING THE SAME

This is a continuation application under 37 CFR 1.62 of prior application Ser. No. 08/820,698, filed Mar. 18, 1997 abandoned; which is a continuation of Ser. No. 08/489,688, filed Jun. 12, 1995 abandoned; which is a continuation of Ser. No. 08/121,445, filed Sep. 14, 1993 abandoned; which is a continuation of Ser. No. 07/682,008, filed Apr. 8, 1991 abandoned.

BACKGROUND OF THE INVENTION

1. Field of the Invention

This invention relates to an image stabilizing adapter device for a camera mounted on the camera to accomplish the image stabilization of the camera.

2. Related Background Art

In recent years, the automatization of functions has advanced in photographing apparatuses such as video cameras so that even persons unskilled in photographic technique can accomplish good photographing by the automatization of focusing and aperture control. However, in spite of various proposals having been made with regard to the trembling of photographed images attributable to the trembling of the photographing apparatus, there has not yet been realized any simple and inexpensive image stabilizing device.

Generally, an image stabilizing device is comprised of trembling amount detection means for detecting the amount of trembling of the entire photographing apparatus, a correcting optical system for correcting the trembling of a photographed image caused by said trembling, calculation means for calculating the amount of driving of said correcting optical system in conformity with the output of said trembling amount detection means, driving means for driving said correcting optical system, control means for operating each of said various means in good order, and power supply means for supplying electric power to all of said various means.

However, where the constituents as described above are incorporated into the photographing apparatus, the image stabilizing device cannot be removed from the photographing apparatus body, and this leads to the following problems:

1) Portability and operability are sacrificed when the image stabilizing function is unnecessary; and
2) The entire product must be designed in a form including the image stabilizing device, and this results in an increase in design cost and production cost.

On the other hand, where the image stabilizing device is made into a removable adapter type to eliminate the above-noted problems, there arise the following problems.

The image stabilizing device does not have means for discriminating the operative state of a camera on which the device is mounted and therefore, the starting and stoppage of the image stabilizing device must be effected with a discrete switch provided on the adapter side. For this reason, the photographer must effect the starting of the camera body side and the starting of the image stabilizing device side discretely from each other each time it effects photographing, and this means a cumbersome operation. So, it is also conceivable to newly provide on the camera body side a terminal exclusively for sending a signal to the image stabilizing device, but in such case, the camera must be designed in advance on the assumption that the image stabilizing device is mounted on the camera side, and this gives rise to an increase in design load and moreover an increase in cost. In addition, the existing product does not have such a function and thus, in that case, the image stabilizing device cannot be used.

Also, the image stabilizing device has a power source discrete from the power source of the photographing apparatus, and this results in an increase in the dimensions and weight of the photographing apparatus. Since in this case, the power source of the image stabilizing device and the power source of the photographing apparatus differ from each other, the timing at which the power source is consumed up differs between the two, and this also leads to the secondary disadvantage that there occurs a case where although image stabilization can be accomplished, photographing cannot be accomplished, or a converse case and the power sources cannot be effectively utilized.

Further, if the power source of the image stabilizing device is made common to the power source of the photographing apparatus, the photographing apparatus body or the power source of the photographing apparatus must be designed with the power supply to the image stabilizing device taken into account, and this leads to increased design and production costs.

SUMMARY OF THE INVENTION

The present invention has been made in view of the above-noted circumstances and intends to provide an image stabilizing adapter device which is provided with image stabilizing means for accomplishing the image stabilization of a camera, detection means responsive to the operative state of the camera to detect a change in the exterior of the camera, and control means responsive to said detection means to control the operation of said image stabilizing means and which is mountable on the camera and in which an operation responding to the operation of the camera side is automatically performed without imparting any load or change to the camera side.

It is another object of the present invention to provide an image stabilizing adapter device which is provided with image stabilizing means for accomplishing the image stabilization of a camera, and distribution means mounted at one side thereof on a mounting portion for mounting the separate type power source unit of the camera thereon and mounting at the other side said separate type power source unit thereon for supplying the electric power from said separate type power source unit to said camera side and said image stabilizing means and which is mountable on the camera and which can be made lightweight and compact and enables effective utilization of the power source.

Other objects of the present invention will become apparent from the following detailed description of some specific embodiments of the invention.

BRIEF DESCRIPTION OF THE DRAWINGS

FIG. 5 is an electric circuit diagram of the image stabilizing adapter of FIG. 5.

OF THE PREFERRED EMBODIMENTS

Some embodiments of the present invention will hereinafter be described with reference to the drawings.

Figure 1:
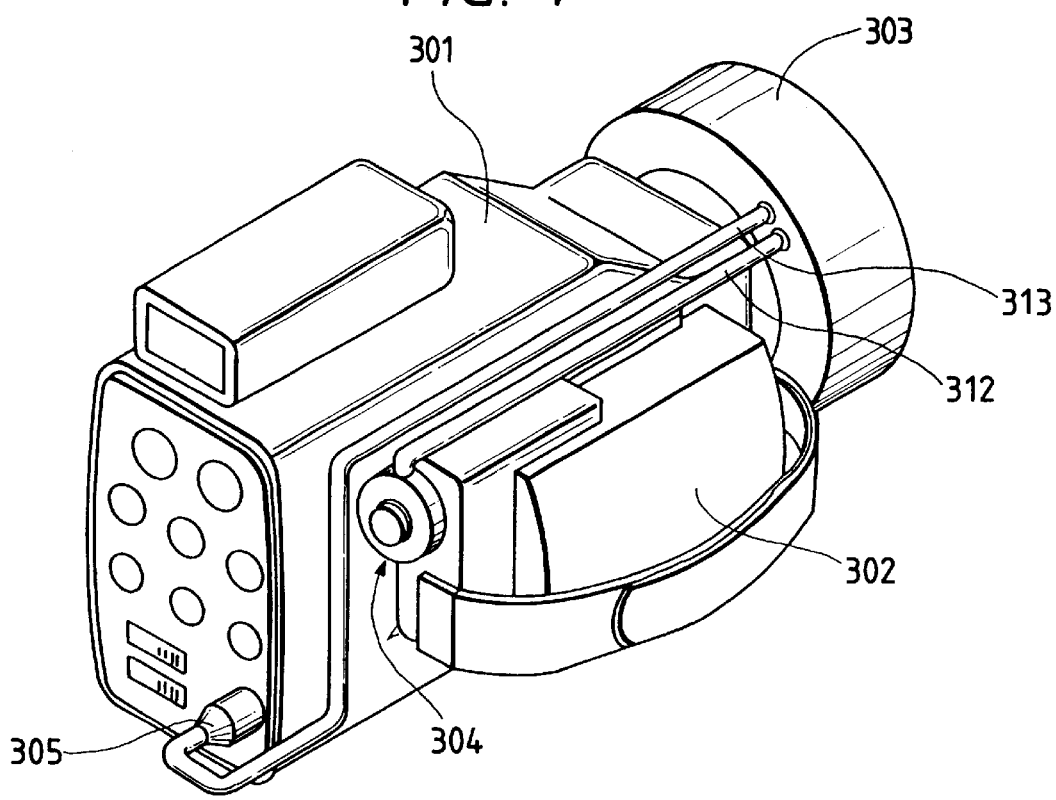
FIG. 1 is a rear perspective view of a video camera having mounted thereon an image stabilizing adapter according to an embodiment of the present invention.
Figure 2:
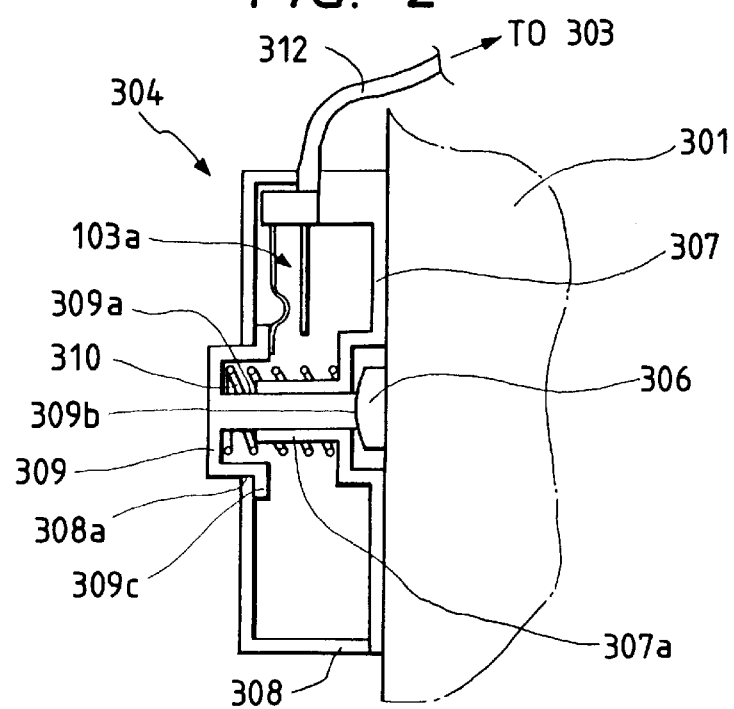
FIG. 2 is a cross-sectional view of a recording switch in the image stabilizing adapter of FIG. 1.

Referring to FIG. 1 which is a perspective view of a video camera having mounted thereon an image vibration adapter device according to an embodiment of the present invention, the reference numeral 301 designates a video camera apparatus, the reference numeral 302 denotes the power source of the video camera, the reference numeral 303 designates an image stabilizing adapter device body (hereinafter referred to as the image stabilizing adapter), and the reference numeral 304 denotes a recording interlocking switch connected to the image stabilizing adapter 303 by a signal line 312. The details of the recording interlocking switch 304 are shown in FIG. 2 which will be described later. The reference numeral 305 designates an AV connection terminal connected to the AV output terminal of the video camera 301 and also connected to the image stabilizing adapter 303 by a signal line 313. FIG. 2 is a view showing the cross-section of the recording interlocking switch 304. The reference numeral 307 denotes a switch ground plate removably mounted on the video camera 301 by a mechanism, not shown, so as to cover the image recording startfinish button 306 of the video camera 301, and a projection 307a having an aperture in which a recording interlocking button 309 to be described is fitted and held is formed on the central portion of the switch ground plate 307. The reference numeral 308 designates a switch cover provided integrally with the switch ground plate 307 and having an aperture 308a for holding the recording interlocking button 309 to be described. The recording interlocking button 309 has a dowel 309a formed in the central portion thereof, the dowel 309a being fitted and held in the apertured portion of the aforedescribed projection 307a. The end portion 309b of the recording interlocking button 309 is disposed to press the image recording start-finish button 306, and is normally biased to the left by the biasing force of a spring 310 and is at rest with the flange portion 309c thereof bearing against the switch cover 308. The reference character 103a denotes an REC switch which is normally open as shown in Figure, but is designed to be closed by the flange portion 309c when the photographer depresses the recording interlocking button 309 to start recording, and simultaneously therewith, the image recording start-finish button 306 is depressed through the dowel 309a and the image recording by the video camera is started.

Figure 3:
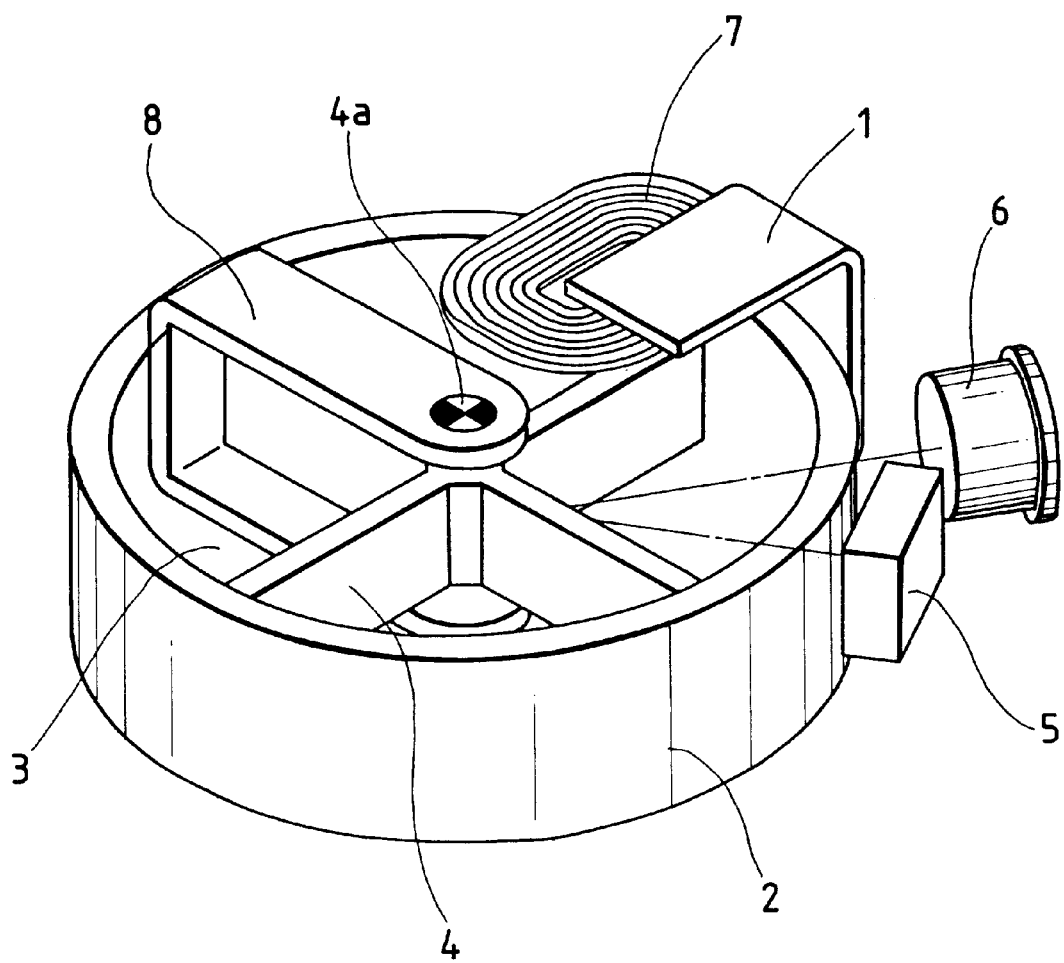
FIG. 3 is a perspective view of the essential portions of an angular displacement detecting device in the image stabilizing adapter of FIG. 1.

FIG. 3 is a perspective view showing the essential portions of angular displacement detecting devices which constitute trembling detection means for detecting the amount of trembling of the video camera in the image stabilizing adapter 303. Two such angular displacement detecting devices are disposed to detect the angular trembling in two directions of pitching and yawing of the video camera body. In FIG. 3, the reference numeral 2 designates an outer cylinder having a chamber in which liquid 3 and a float 4 are enclosed. The float 4 is held by a float holder 8 for rotation about a shaft 4a, and has a slit-shaped reflecting surface formed on the side thereof, and is formed of a permanent magnet material and magnetized in the direction of the shaft 4a. Also, this float 4 is designed with its rotation balance about the shaft 4a and its buoyancy balance kept. The reference numeral 1 designates a U-shaped yoke mounted in fixed relationship with the outer cylinder 2. The U-shaped yoke 1 is disposed so as to embrace one end of the cruciform arm of the float 4 in the direction of the shaft 4a, and forms a closed magnetic circuit of float-yoke-float. The reference numeral 7 denotes a coil disposed between the float 4 and the yoke 1 and provided in fixed relationship with the outer cylinder 2. The reference numeral 6 designates a light emitting element (IRED) emitting light upon electrical energization, and the reference numeral 5 denotes a light receiving element (PSD) whose output is varied by the position of the light received. The light emitting element 6 and the light receiving element 5 together constitute optical angular displacement detecting means of the type which transmits light through the reflecting surface of the float 4.

In the above-described construction, the float 4 is of a symmetrical shape with respect to the rotary shaft 4a so that the rotational moment by the influence of gravity may not occur in any posture and any load may substantially not act on the pivot shaft and moreover, is formed of a material of the same specific gravity as the liquid 3. In reality, zero unbalance component is impossible, but a shape error acts as unbalance by only the difference in specific gravity and therefore, it will be readily understood that the shape error is substantially sufficiently small and the SN ratio of friction to inertia is very good.

In such a construction, even if the outer cylinder 2 rotates about the rotary shaft 4a, the liquid 3 therein is at rest relative to absolute space due to inertia and therefore, the float 4 which is in a suspended state does not rotate and thus, the outer cylinder 2 and the float 4 rotate relative to each other about the rotary shaft 4a. The relative angular displacement of these can be detected by the optical detection means using the light emitting element 6 and the light receiving element 5.

Now, in the device having the above-described construction, the detection of.angular displacement is effected as follows.

First, the light emitted from the light emitting element 6 is applied to the float 4, from which the light is reflected by the slit-shaped reflecting surface and reaches the light receiving element 5. During the transmission of said light, the light forms a slit image on the light receiving element 9.

The outer cylinder 2, the light emitting element 6 and the light receiving element 5 are all in fixed relationship with one another and move together and therefore, when relative angular displacement motion occurs between the outer cylinder 2 and the float 4, the slit image on the light receiving element 5 moves by an amount conforming to said displacement. Accordingly, the output of the light receiving element 5 which is a photoelectric conversion element whose output is varied by the position of the received light is an output proportional to the displacement of the position of said slit image, and the angular displacement of the outer cylinder 2 can be detected with said output as information.

Now, as previously described, the float 4 is formed of a permanent magnet material of the same specific gravity as the liquid 3, and it is formed, for example, in the following manner.

Where inert liquid of fluorine line is used as the liquid, if fine powder of a permanent magnet material (such as ferrite) is contained as a filler in the inert liquid with a plastic material as the base and the content thereof is regulated, it is easy to provide a specific gravity of the same degree as the specific gravity of the liquid at a volume content of about 8%. If the float 4 is magnetized in the direction of the shaft 4a after or when the float 4 is formed of such a material, the float 4 has the nature as a permanent magnet.

The float 4 is magnetized in the direction of the shaft 4a, and for example, the upper side thereof is magnetized to N pole and the lower side thereof is magnetized to S pole. The magnetic line of force from the N pole constitutes a closed magnetic path which passes through the U-shaped yoke to the S pole, and if an electric current is supplied to the coil 7 disposed in this magnetic path, the coil 7 receives a force in accordance with Fleming's left-hand rule. However, the coil 7 is provided in fixed relationship with the outer cylinder 2 and therefore cannot move, and by the reaction force thereof, the float 4 is driven. Of course, this force is proportional to the electric current supplied to the coil, and the direction of the force will become opposite if the electric current is supplied in the opposite direction.

Figure 4A:
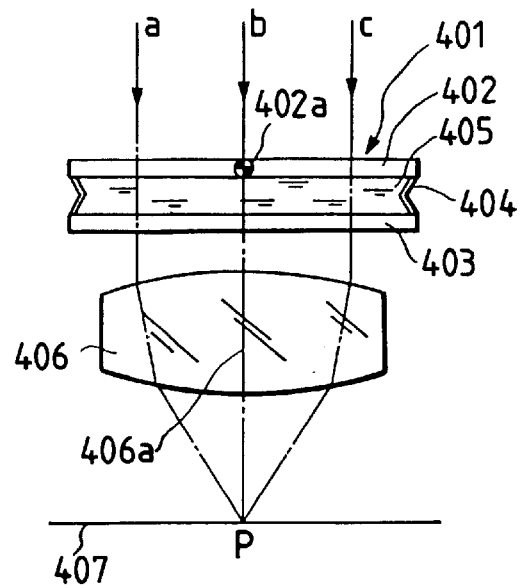
FIG. 4A to 4C are cross-sectional view of a variable vertical angle prism in the image stabilizing adapter of FIG. 1.

FIG. 4 illustrates the principle of a variable vertical angle prism as a correcting optical system driven to correct the trembling of an image on the basis of the information of said trembling detection means in the image stabilizing adapter 303. The reference numeral 401 designates a variable vertical angle prism which is a correcting optical system. The variable vertical angle prism is constructed in the following manner. The outer peripheral portions of a circular front glass plate 402 and a rear glass plate 403 are connected together by a bellows-like flexible cylindrical member 404, and transparent liquid 405 is hermetically sealed in a hermetically sealed chamber surrounded by the front glass plate 402, the rear glass plate 403 and the flexible cylindrical member 404. The front glass plate 402 is held on the image stabilizing adapter 303 by a mechanism, not shown, for rotation about a shaft 402a in a plane perpendicular to the plane of the drawing sheet, the rear glass plate 403 is held on the image stabilizing adapter 303 by a mechanism, not shown, for rotation about a horizontal axis in FIG. 4 orthogonal to the shaft 402a, and these glass plates are designed to correct trembling in the directions of yawing and pitching, respectively. The reference numeral 406 denotes a photo-taking optical system, the reference character 406a designates the optic axis of said photo-taking optical system, and the reference numeral 407 denotes an image plane. Lights a, b and c from the object side form an image at a point P on the image plane 407 (FIG. 4A).

Figure 4B:
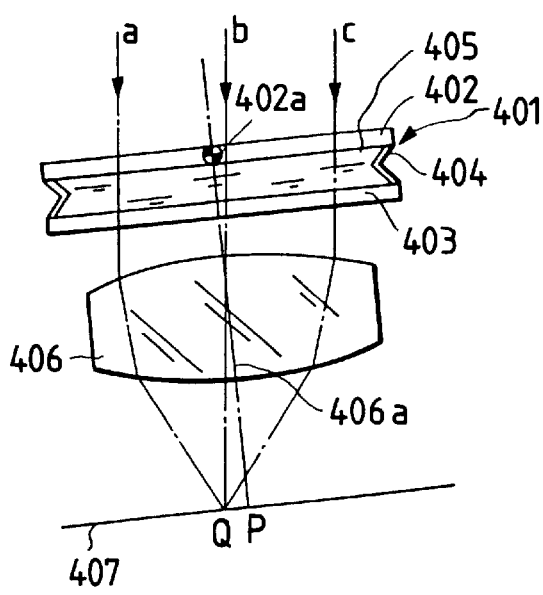
Figure 4C:
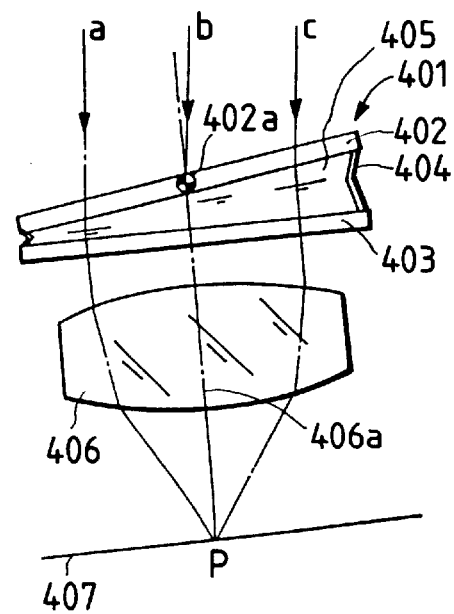

Now, if angular trembling occurs to the video camera body in the direction of yawing, as shown in FIG. 4B, the video camera photographs in a direction deviating by a certain angle relative to the state of FIG. 4A and the same lights a, b and c as those in FIG. 4A form an image at a point Q on the image plane 407. Thus, the resultant image suffers from trembling. So, the amount of trembling of the video camera is detected by the angular displacement detecting device which is the trembling detection means, and the front glass plate 402 is rotatively driven about the shaft 402a by a driving device (such as a voice coil) on the basis of the detected amount to offset said angular trembling, and the light rays are bent by the prism action to cause them to form an image at the original point P (FIG. 4C). Correction in the direction of pitching is likewise effected by the rear glass plate 403.

In the correcting optical system as described above, the lights are bent ahead of the photo-taking optical system to offset the trembling of the camera and therefore, the phototaking optical system used rearwardly of the correcting optical system may be of any type and is best suited as an adapter.

Figure 6:
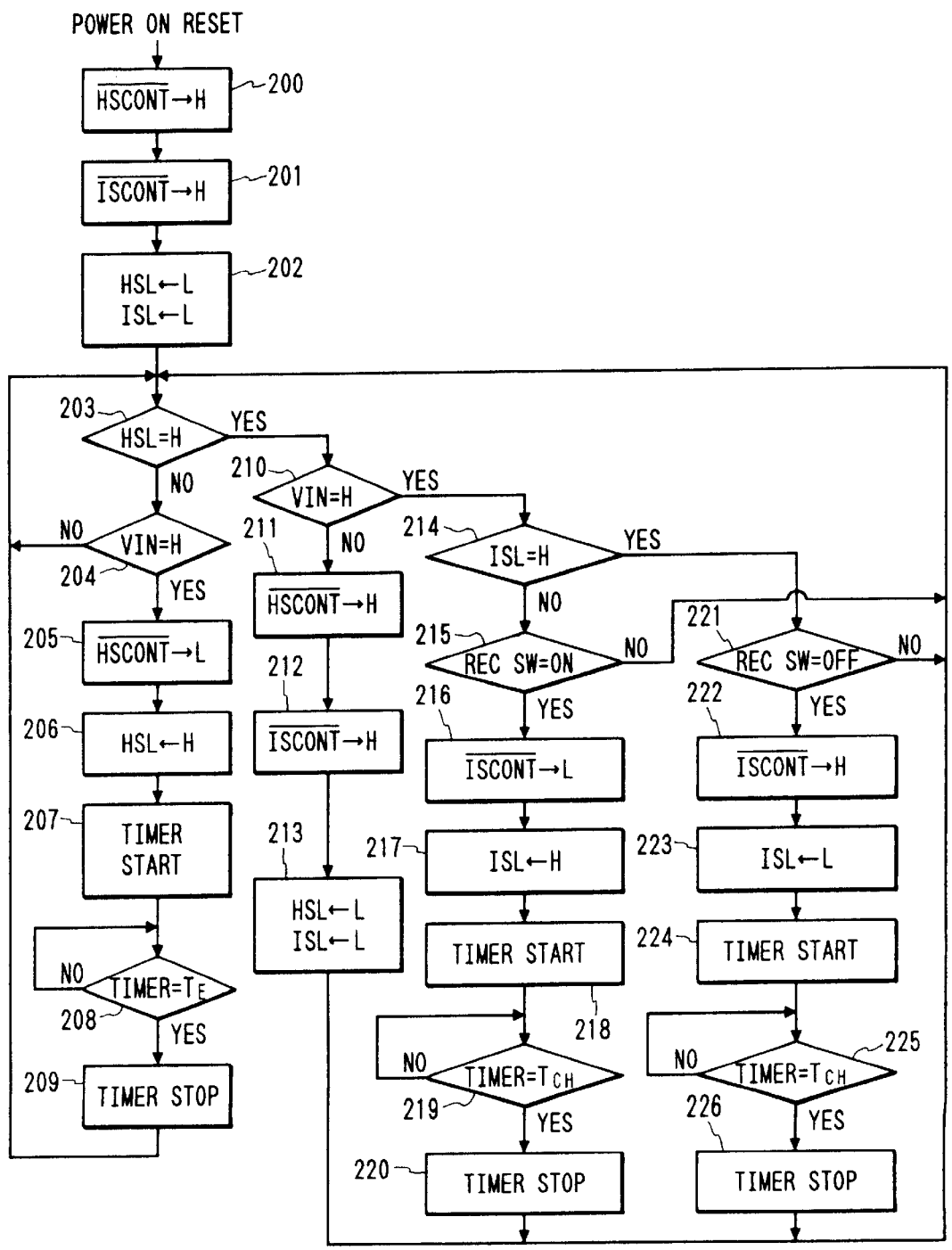
FIG. 6 is a flow chart showing the operation of the circuit of FIG. 5.
Figure 7:
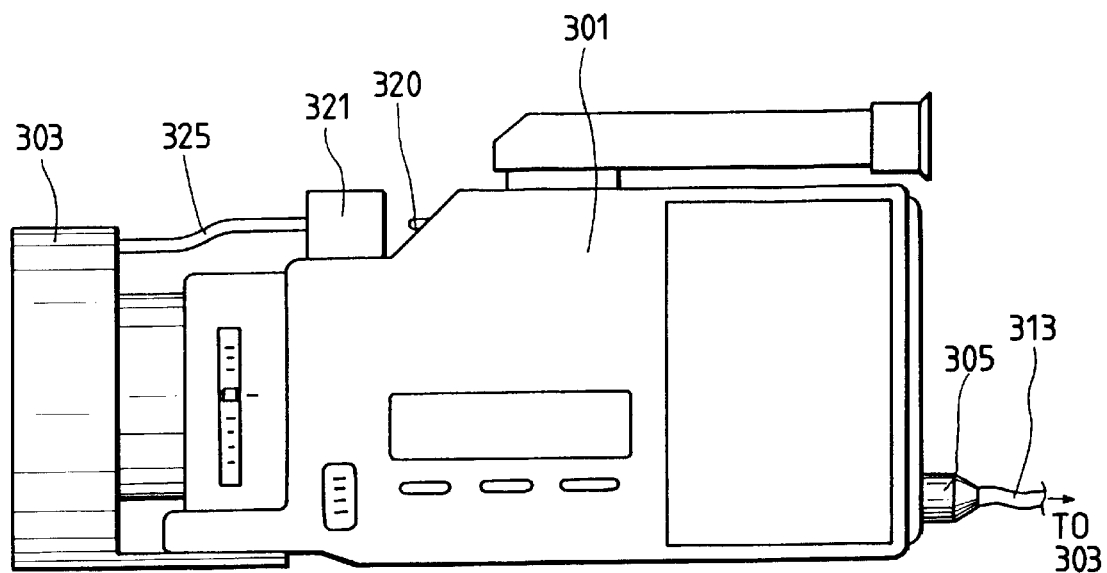
FIG. 7 is a side view of a video camera having mounted thereon an image vibration adapter according to a second embodiment of the present invention.
Figure 8:
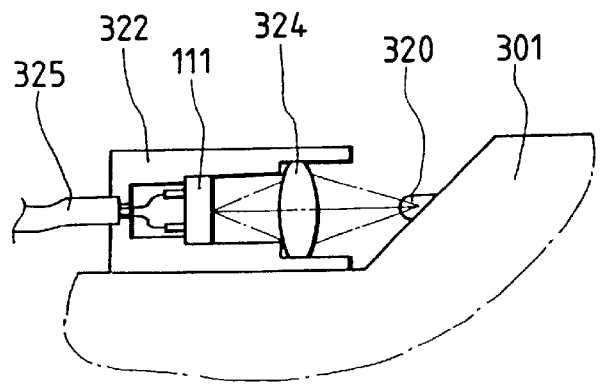
FIG. 8 is a cross-sectional view of light emission detecting means in the image stabilizing adapter of FIG. 7.

The construction and operation of the electric circuit of the image stabilizing adapter 303 will now be described with reference to FIGS. 5 and 6. In FIG. 5, parts identical to those in FIG. 4 are given identical reference characters.

In FIG. 5, the angular displacement detecting device shown in FIG. 3 has its outer cylinder 2 filled with the liquid 3 as previously described, and the float 4 freely rotatable about the predetermined rotary shaft 4a is installed in the liquid. Also, the coil 7 is installed between the float 4 and the yoke 1 provided so as to constitute a closed magnetic circuit, as shown.

Assuming that in this state, the outer cylinder 2 moving with the camera has rotated by θ in relative to absolute space under the influence of hand trembling, the float 4 therein maintains its stationary state relative to the absolute space due to the inertia of the liquid and thus, the float 4 has rotated relative to the outer cylinder 2. Consequently, the amount of this relative displacement can be detected by the use of optical detection means using the light emitting element 6 and light receiving element 5 which move with the camera. The signal light emitted from the light emitting element 6 is reflected by the surface of the float 4 and enters the light receiving element 5 for position detection and, if as a result, the float 4 rotates relative to the outer cylinder 2, the position of incidence of the reflected signal light onto the light receiving element 5 will change and therefore, the output currents Ia and Ib of the light receiving element 5 will be varied by the movement of the float 4. The output currents Ia and Ib are amplified by a current-voltage converting circuit constituted by an operational amplifier 10, a resistor 11 and a capacitor 12 and a current-voltage converting circuit constituted by an operational amplifier 13, a resistor 14 and a capacitor 15, and their respective outputs are input to an addition circuit constituted by an operational amplifier 21 and resistors 22, 23, 24 and 25 and a substration circuit constituted by an operational amplifier 16 and resistors 17, 18, 19 and 20. The output of this addition circuit is input to an iRED driver circuit constituted by an operational amplifier 26, resistors 27, 28, 31, a capacitor 29 and a transistor 30, and feedback control is done so that the output of the addition circuit may become equal to KVC.

On the other hand, the angle of displacement of the variable vertical angle prism 401 used in the correcting optical system shown in FIG. 4 is also detected by entirely the same method as said angular displacement detecting device. A slit operatively associated with the movement of the variable vertical angle prism is provided between a light emitting element 44 and a light receiving element 43, and photocurrents Ic and Id are produced from the light receiving element 43 by the movement of the slit. These photocurrents are varied by the movement of the float 4 in a manner similar to that previously described. Output currents Ia and Ib are respectively amplified by a current-voltage converting circuit constituted by an operational amplifier 50, a resistor 51 and a capacitor 52 and a current-voltage converting circuit constituted by an operational amplifier 53, a resistor 54 and a capacitor 55, and their respective outputs are input to a subtraction circuit constituted by an operational amplifier 56 and resistors 57, 58, 59 and 60 and an addition circuit constituted by an operational amplifier 61 and resistors 62, 63, 64 and 65, and the output of this addition circuit is input to an iRED driver circuit constituted by an operational amplifier 66, resistors 67, 68, 71, a capacitor 69 and a transistor 70 and therefore, the output of the addition circuit is always equal to a reference potential KVC. In the manner described above, the outputs of said two subtraction circuits represent the amount of angular displacement relative to the absolute space and the amount of displacement of the variable vertical angle prism, respectively.

The output of an operational amplifier 16 is input through an analog switch 35 to a coil driver constituted by an operational amplifier 32 and transistors 33 and 34 and therefore, if the analog switch 35 is ON, the electric current flowing to the coil 7 is determined in conformity with the output of an operational amplifier 115. As previously described, if an electric current is supplied to the coil 7 placed in the closed magnetic circuit constituted by the yoke 1 and the float 4, there is created a force based on Fleming's left-hand rule and therefore, by controlling this electric current, it is possible to control the operation and characteristic of the angular displacement detecting device.

Also, the output of the operational amplifier 16 is connected to a resistor 83 through an analog switch 80, and the output of the operational amplifier 56 is connected to a resistor 84, and both of them are connected to the inverting input terminal of an operational amplifier 85 to which a feedback resistor 86 is connected. The output of the operational amplifier 85 is input to a phase compensation circuit constituted by an operational amplifier 90, resistors 92, 93 and a capacitor 91, whereby the phase compensation of the whole feedback system is done and further, this output is input to a power amplifying circuit constituted by an operational amplifier 97 and an inverting type power amplifying circuit constituted by an operational amplifier 94 and resistors 95 and 96, and the power supply to a voice coil 98 is effected by the outputs of these two amplifying circuits.

According to the above-described construction, the variable vertical angle prism is driven so that the amount of movement thereof may be equal to the output of the angular displacement detecting device which detects the amount of trembling relative to the absolute space, and even if the camera moves relative to the absolute space, the object image on the image plane of the camera can keep its stationary state by the movement of the correcting optical system 401.

The reference numeral 100 designates a control circuit (hereinafter referred to as CPU) constituted by a microcomputer or the like having a timer circuit 104 therein, the reference numeral 101 denotes a video signal detection circuit which renders the output VIN into H level and inputs it to the CPU 100 when a video signal is detected from the AV terminal of the video camera 301 through the signal line 313 of FIG. 1, the reference numeral 102 designates a switch interface for inputting to the CPU 100 the states of various switches 103a–103k including the REC switch 103a of FIG. 2, and the reference numerals 36 and 81 denote analog switches controlled by the CPU 100.

The operation of the construction of FIG. 5 will now be described with reference to the flow chart of FIG. 6.

CPU 100 is first subjected to internal initialization by a power on reset circuit, not shown, and at a step 200, $\overline{\text{HSCONT}}$ output is rendered into H level and as a result, the analog switch 35 becomes OFF through an inverter 37 and the analog switch 36 becomes ON, and the power supply to the coil 7 becomes stopped. Next, at a step 201, $\overline{\text{ISCONT}}$ output assumes H level and therefore, the analog switch 81 becomes ON and the analog switch 80 becomes OFF through an inverter 82 and thus, the output of the angular displacement detecting device which detects the amount of trembling is disconnected from the circuit for driving the variable vertical angle prism 401, which thus keeps its stationary state. Subsequently, at a step 202, HSL which has latched the controlled state of the angular displacement detecting device and ISL which has latched the controlled state of the variable vertical angle prism 401 are reset to L level.

At a step 203, the state of HSL is detected, and if HSL is H, advance is made to a step 210, but if HSL is L, advance is made to a step 204, where the detection of a video signal taken out from the AV terminal of the video camera is effected. When the power source switch of the video camera body is not ON, the video signal is not detected as a matter of course and therefore, the output VIN of the video signal detection circuit 101 assumes L level, and return is made to the step 203. However, when the power source switch of the video camera body is ON and the video camera is in its standby state (that is, is not in its image recording state), a video signal is output from the AV terminal and therefore, the output VIN of the video signal detecting circuit 101 assumes H level, and advance is made to a step 205. At a step 205, $\overline{\text{HSCONT}}$ is rendered into L level to raise the angular displacement detecting device into a predetermined state, and the analog switch 35 is rendered into its ON state by this output through an inverter 37 and thus, the coil 7 is driven in conformity with the output of the angular displacement detecting device. Further, at a step 206, the control of the angular displacement detecting device is started and thus, HSL is rendered into H level. Next, at a step 207, the timer circuit 104 in the CPU 100 is started and the time until the angular displacement detecting device rises into a predetermined state is secured. At a step 208, whether the value of the timer has reached a predetermined time $T_E$ is judged, and if it has reached the predetermined time $TE_E$, advance is made to a step 209, where the timer circuit 104 is stopped, whereafter return is made to the step 203.

Next, if at a step 203, the control of the angular displacement detecting device is already started and this detecting device has risen into a predetermined state, advance is made to a flow 210, where whether a video signal is output from the video camera body is detected. When the power source switch of the video camera body is OFF, the output VIN of the video signal detecting circuit 101 assumes L level and therefore, advance is made to a step 211, where $\overline{\text{HSCONT}}$ is rendered into H level and the power supply to the coil for controlling the angular displacement detecting device is stopped, and at a step 212, $\overline{\text{ISCONT}}$ is rendered into H level and the output of the angular displacement detecting device is disconnected from a circuit for driving the variable vertical angle prism and further, at a step 213, HSL and ISL are reset to L level.

If at the step 210, the video signal is detected, advance is made to a step 214, and when ISL is reset to L, it is judged that the image stabilizing operation has not been started, and advance is made to a step 215. At the step 215, the state of the REC switch 103a operatively associated with the image recording by the video camera body which has been described in connection with FIG. 2 is detected, and if this switch is OFF, return is made to the step 203, but if this switch is ON, advance is made to a step 216, where $\overline{\text{ISCONT}}$ output is rendered into L level and as a result, the analog switch 80 becomes ON through an inverter 82, whereby the image stabilizing operation is started. Further, at a step 217, ISL which indicates that image stabilization is being effected is rendered into H level, and at a step 218, a timer circuit 104 for eliminating the chattering of the REC switch 103a is started. At a step 219, whether the value of the timer circuit 104 has reached $T_{CH}$ is judged, and if it has reached $T_{CH}$, at a step 220, the timer circuit 104 is stopped, whereafter return is made to the step 203.

Also, if at the step 214, the image stabilizing operation is already started and ISL assumes H level, at a step 221, whether the REC switch 103a is OFF is judged, and if this switch is ON, return is made to the step 203, but if this switch is OFF, advance is made to a step 222, where $\overline{\text{ISCONT}}$ output is rendered into H level and the image stabilizing operation is terminated. Subsequently, at a step 223, ISL which detects the state of the image stabilizing operation is reset to L level, and at a step 224, the timer circuit 104 for eliminating the chattering of the REC switch 308a. If at a step 225, the value of the timer circuit 104 has reached $T_{CH}$, at a step 226, the timer circuit 104 is stopped and return is made to the step 203.

FIGS. 7 to 10 show another embodiment of the present invention. In these figures, the same functional portions as those in the previous embodiment are given the same reference characters and need not be described.

The reference numeral 320 designates a recording lamp for indicating that the video camera 301 is in its recording state. The recording lamp 320 is turned on or turned on and off only when the video camera is in its recording state. The reference numeral 321 denotes light emission detecting means for detecting the light emission of the recording lamp 320. The light emission detecting means 321 is constructed as follows, as shown in the cross-sectional view of FIG. 8. The reference numeral 322 designates a cylindrical light emission detecting body in which a photoelectric conversion element 323 to be described and a condensing lens 324 are held, and which is designed to be mounted forwardly of the recording lamp 320 of the video camera 301 by a mechanism, not shown. The reference numeral 111 denotes a light receiving sensor which receives the light of the recording lamp 320 condensed by the condensing lens 324 and outputs a signal to the image stabilizing adapter 303 through the light receiving state signal line 325 thereof. The trembling detection means and correcting optical system in the image stabilizing adapter are similar to those in the aforedescribed embodiment and need not be described.

The construction and operation of the electric circuit of the second embodiment of the present invention will now be described with reference to FIGS. 9 and 10.

Figure 9:
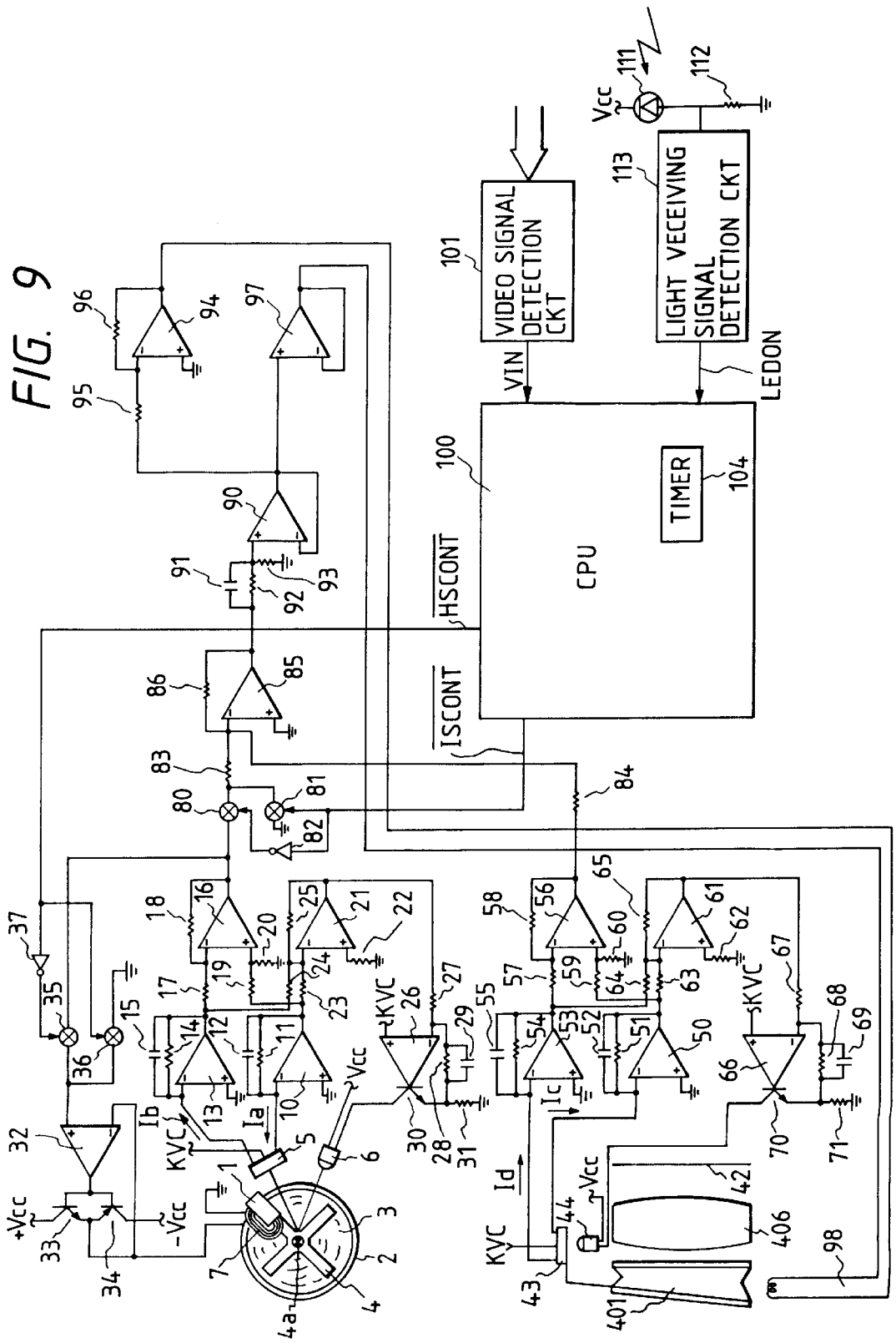
FIG. 9 is an electric circuit diagram of the image stabilizing adapter of FIG. 7.
Figure 10:
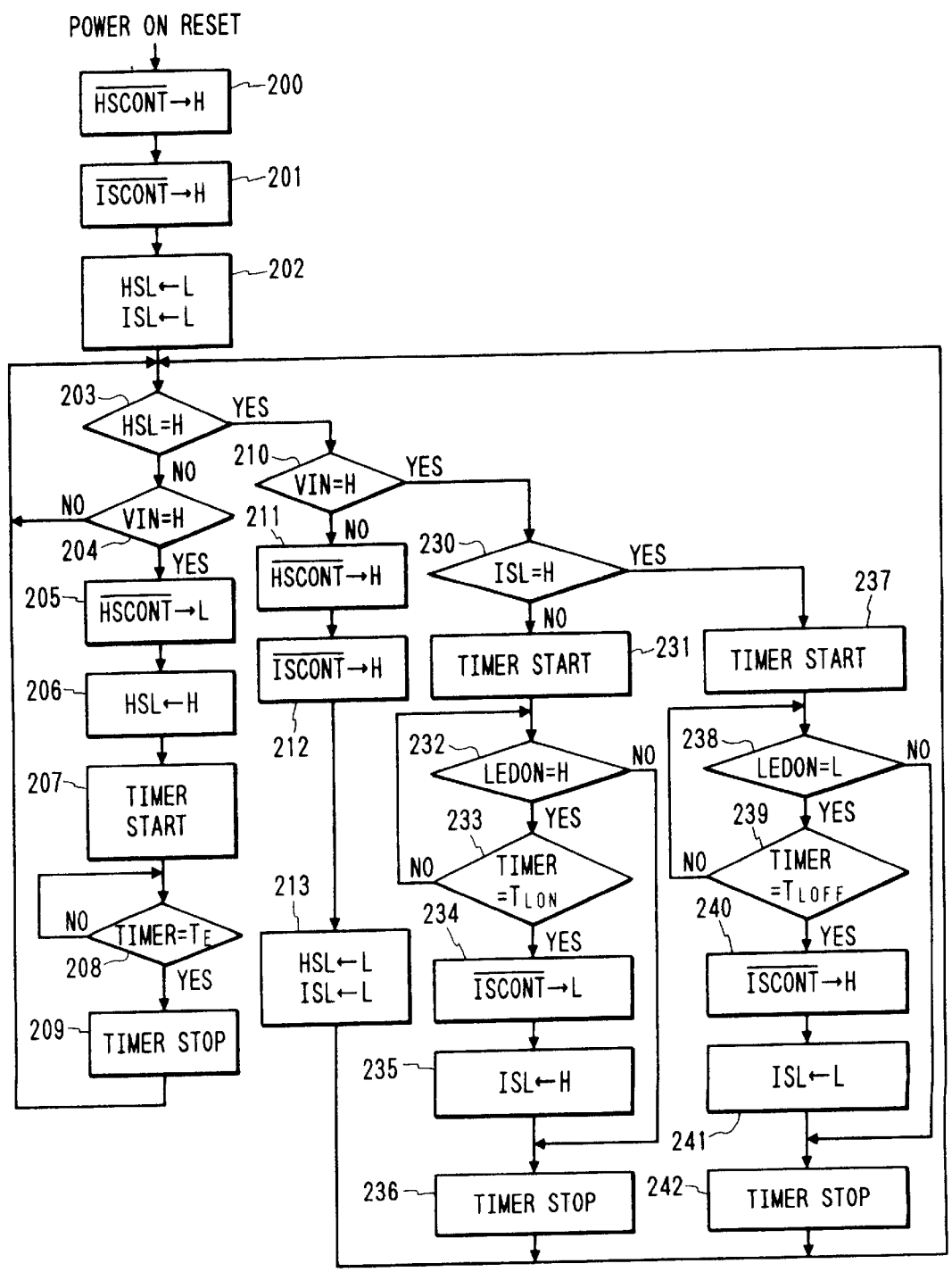
FIG. 10 is a flow chart showing the operation of the circuit of FIG. 9.

In FIG. 9, the reference numerals 1–101 are entirely similar in significance to those in the first embodiment, the reference numeral 111 designates the light receiving sensor for detecting the recording confirmation lamp of the video camera body, the reference numeral 112 denotes a resistor for converting the photocurrent from the light receiving sensor 111 into a voltage, and the reference numeral 113 designates a light receiving signal detection circuit for converting the voltage of the light receiving signal of the resistor 112 into a predetermined level of signal.

The operation of the present embodiment will now be described with reference to the flow chart of FIG. 10.

Steps 200–213 are similar to those in the first embodiment, and only steps 230 and so on will hereinafter be described. When the video camera body is in its standby state, at a step 230, the state of ISL which indicates the state of the image stabilizing operation is examined, and if ISL is reset to L, advance is made to a step 231, where the timer circuit 104 is started, and subsequently, at a step 232, the state of the output LEDON of the light receiving signal detection circuit 110 is checked up. If the output LEDON is at L level, advance is immediately made to a step 236, but if the output LEDON is at H level, at a step 233, whether the value of the timer circuit 104 has reached a predetermined value $T_{LON}$ is judged. Accordingly, if the H level of the output LEDON is detected for the predetermined time $T_{LON}$, it is judged that the recording by the video camera body has been started, and advance is made to a step 234, where $\overline{\text{ISCONT}}$ output is rendered into L level, whereby the image stabilizing operation is started. Further,. at a step 235, ISL which indicates that image stabilization is being effected is rendered into H level, and at a step 236, the timer circuit 104 is stopped and return is made to the step 203.

Next, if at the step 230, ISL is set to H level, advance is made to a step 237, where the timer circuit 104 is started and subsequently, at a step 238, the state of the output LEDON of the light receiving signal detection circuit 110 is checked up. If the output LEDON is at H level, it is judged that the recording state of the video camera body is being continued, and advance is immediately made to a step 241, but if the output LEDON is at L level, advance is made to a step 239, where whether the value of the timer circuit 104 has reached a predetermined value $T_{LOFF}$ is judged. Accordingly, if the L level of the output LEDON is detected for the predetermined time $T_{LOFF}$, it is judged that the recording by the video camera body has been terminated, and advance is made to a step 240, where $\overline{\text{ISCONT}}$ output is rendered into H level and the image stabilizing operation is terminated. Further, at a step 241, ISL which indicates that image stabilization is being effected is rendered into L level, and at a step 242, the timer circuit 104 is stopped and return is made to the step 203.

The construction and operation of an electric circuit showing a third embodiment of the present invention will now be described with reference to FIGS. 11 and 12.

Figure 11:
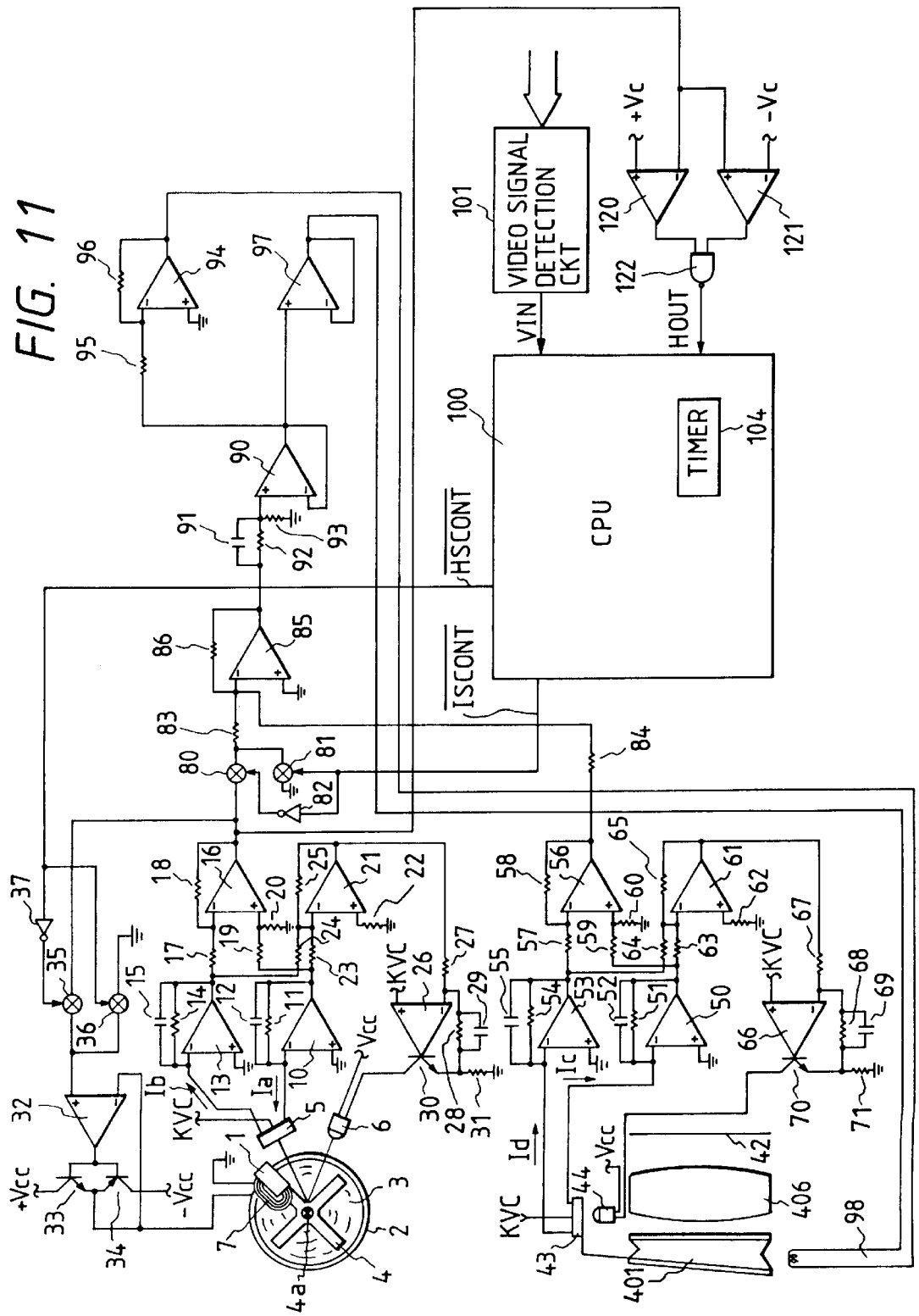
FIG. 11 is an electric circuit diagram showing a third embodiment of the present invention.
Figure 12:
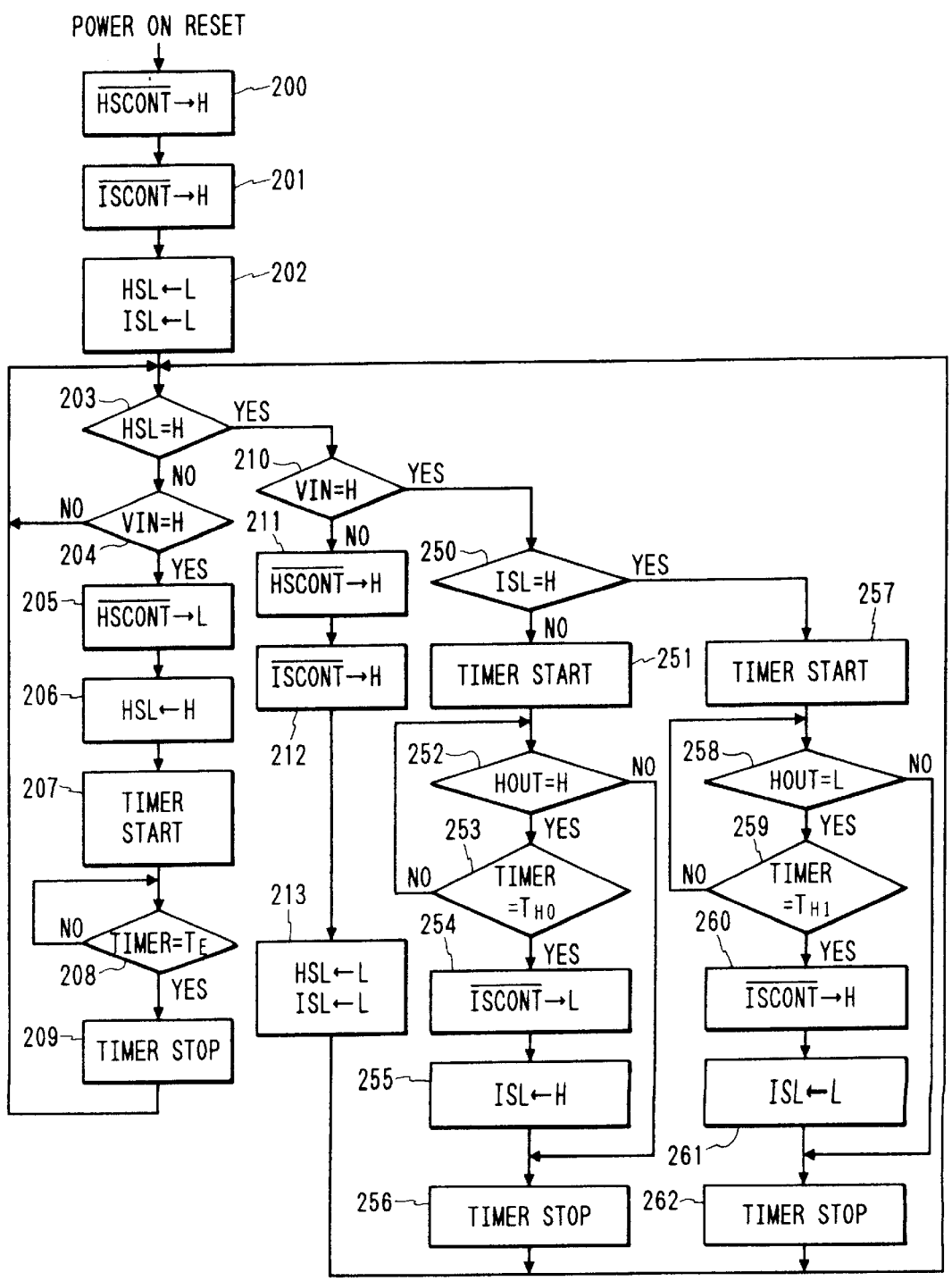
FIG. 12 is a flow chart showing the operation of the circuit of FIG. 11.

In FIG. 11, the reference numerals 1–101 are entirely similar in significance to those in the first embodiment, and comparators 120 and 121 and a NAND gate 122 together constitute a window comparator for the output of the angular displacement detecting device.

The operation of the present embodiment will now be described with reference to the flow chart of FIG. 12.

Steps 200–213 are similar to those in the first embodiment and therefore, steps 250 and so on will hereinafter be described. If here, the value of ISL which indicates the image stabilizing operation is reset to L level, advance is made to a step 251, where the timer circuit 104 is started and further, at a step 252, the output level of the angular displacement detecting device is judged. If the output of the angular displacement detecting device (the output of the operational amplifier 16) is within a predetermined range (+VC--VC), the output HOUT of said window comparator is at L level and therefore, advance is immediately made to a step 256, but if the output of the angular displacement detecting device exceeds the predetermined range, the output HOUT assumes H level and advance is made to a step 253, where whether the value of the timer circuit 104 has reached a predetermined value $T_{HO}$ is judged. Accordingly, if a state in which the output of the angular displacement detecting device exceeds a predetermined level is detected for a predetermined period $T_{HO}$, it is judged that the image stabilizing operation is necessary, and advance is made to a step 254, where $\overline{\text{ISCONT}}$ output is rendered into L level, whereby the image stabilizing operation is started. Further, at a step 255, ISL which indicates that image stabilization is being effected is rendered into H level, and at a step 256, the timer circuit 104 is stopped and return is made to the step 203.

Next, if at the step 250, ISL is set to H level, advance is made to a step 257, where the timer circuit 104 is started and subsequently, at a step 258, the output level of the angular displacement detecting device is judged. If the output of the angular displacement detecting device exceeds a predetermined range, the output HOUT of the window comparator is at H level and therefore, advance is immediately made to a step 262, but if the output of the angular displacement detecting device is within the predetermined range, the output HOUT assumes L level and advance is made to a step 259, where whether the value of the timer circuit 104 has reached a predetermined value $T_{HI}$ is judged. Accordingly, if a state in which the output of the angular displacement detecting device is within a predetermined level is detected for the predetermined period $T_{HI}$, it is judged that the image stabilizing operation is unnecessary and advance is made to a step 260, where $\overline{\text{ISCONT}}$ output is rendered into H level, whereby the image stabilizing operation is terminated. Further, at a step 261, ISL which indicates that image stabilization is being effected is rendered into H level, and at a step 262, the timer circuit 104 is stopped and return is made to the step 203.

The details of a fourth embodiment of the present invention will hereinafter be described with reference to FIGS. 13 to 15.

Figure 13:
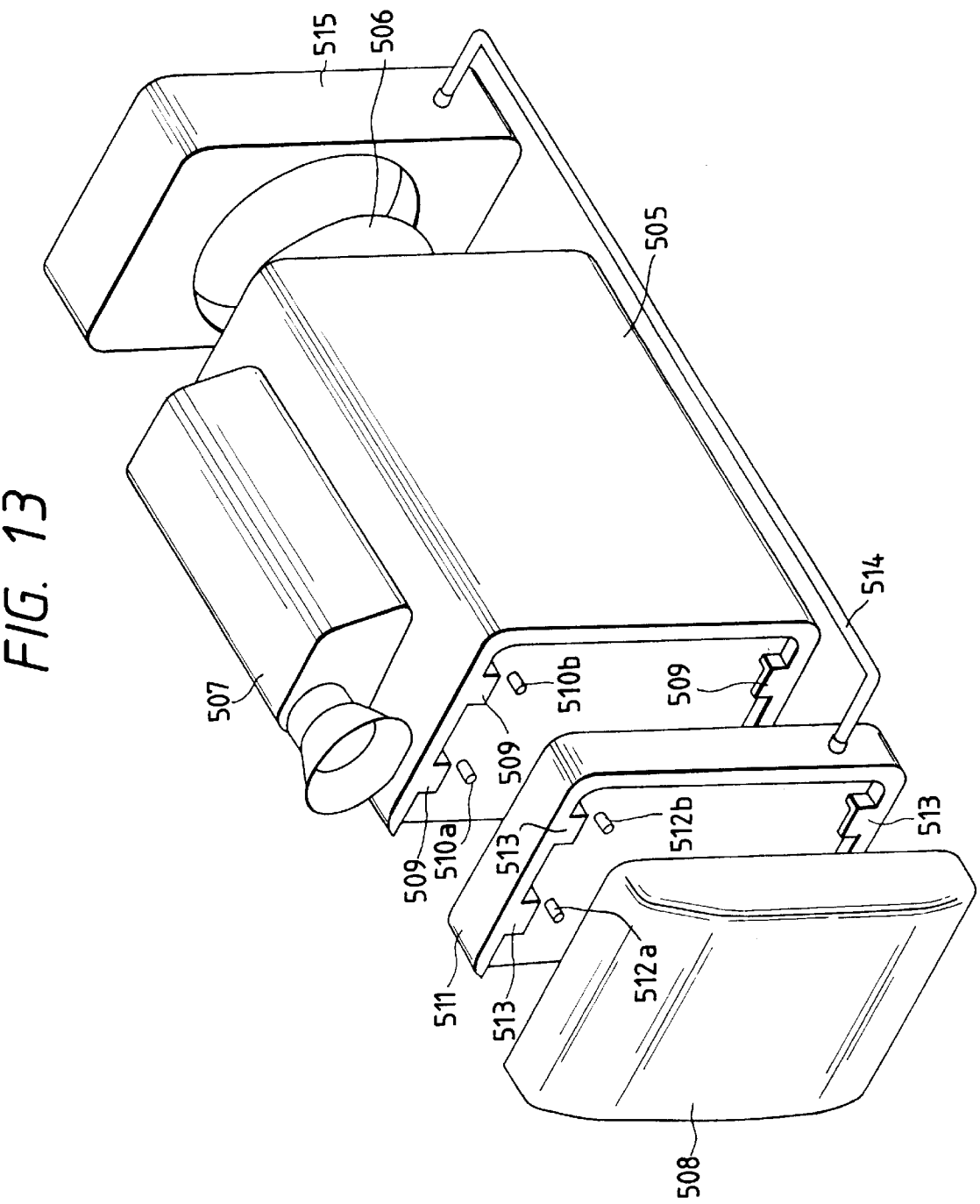
FIG. 13 is a perspective view showing a device according to a fourth embodiment of the present invention and a photographing apparatus on which the device is mounted.

In FIG. 13, the reference numeral 505 designates a photographing apparatus body. A phototaking lens barrel 506 is disposed on the front face of the photographing apparatus 505, and a viewfinder 507 provided with a display element or the like for observing a photographed image is disposed above the photographing apparatus 505. Rearwardly of the photographing apparatus 505, there are disposed an engagement member 509 for mounting a separate type power source unit 508 and contacts 510*a* and 510*b* for taking out electric power from the separate type power source unit 508. On the other hand, on the separate type power source unit 508, there are disposed an engagement member (not shown) for slidably engaging the engagement member 509 to thereby engage the photographing apparatus 505, and a contact (not shown) for contacting with the contacts 510*a* and 510*b* to thereby supply electric power to the photographing apparatus 505. The contacts 510*a* and 510*b* are resiliently studded on the body of the photographing apparatus 505 by the use of springs or the like, and are designed to pressure-contact with the power source side contacts, not shown, when the separate type power source unit 508 is mounted.

The reference numeral 511 denotes a distribution adapter, one surface of which is of entirely the same shape as the rear portion of the photographing apparatus 505, that is, there are disposed an engagement member 513 for mounting the separate type power source unit 508 and contacts 512*a* and 512*b* for taking out electric power from the separate type power source unit 508. The contacts 512*a* and 512*b*, like the contacts 510*a* and 510*b*, are resiliently studded on the distribution adapter 511. On the other hand, the other surface of the distribution adapter 511 is of the same shape as the mounting portion for the separate type power source unit 508, that is, there are disposed an engagement member (not shown) for slidably engaging the engagement member 509 disposed on the photographing apparatus 505, and a contact (not shown) for supplying electric power to the photographing apparatus 505.

The distribution adapter 511 is connected to an image stabilizing adapter device like that of the aforedescribed embodiment by a power transmission cable 514.

Figure 14:
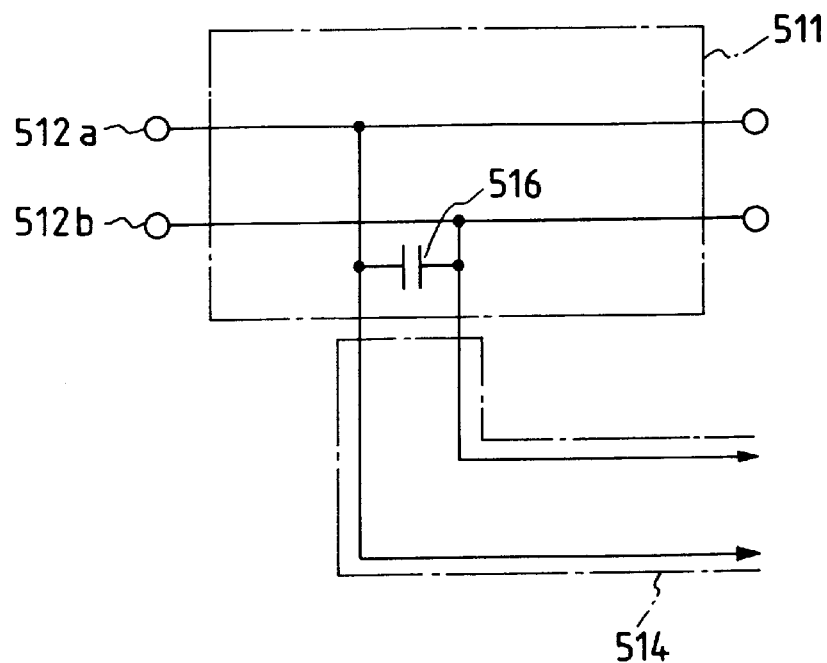
FIG. 14 is a circuit diagram showing the construction of the interior of the distribution adapter shown in FIG. 13.

FIG. 14 is a circuit diagram showing the interior of the distribution adapter 511.

Electric power supplied to the contacts 512*a* and 512*b* is delivered as a power source to the contacts 510*a* and 510*b* of the photographing apparatus and is also delivered as a power source to the image stabilizing adapter device 515 through the parallel-connected power transmission cable 514. Since the photographing apparatus 505 and the image stabilizing adapter device 515 are parallel-connected to each other, the voltage applied to the photographing apparatus 505 drops by an amount corresponding to the voltage drop resulting from an increase in electric current caused by the image stabilizing adapter device 515 being connected to the photographing apparatus, but generally this amount is not great and can be confined within the surplus range of the source voltage. In FIG. 14, a capacitor 516 is parallel-connected for the purpose of eliminating the influence of power source fluctuation.

Figure 15:
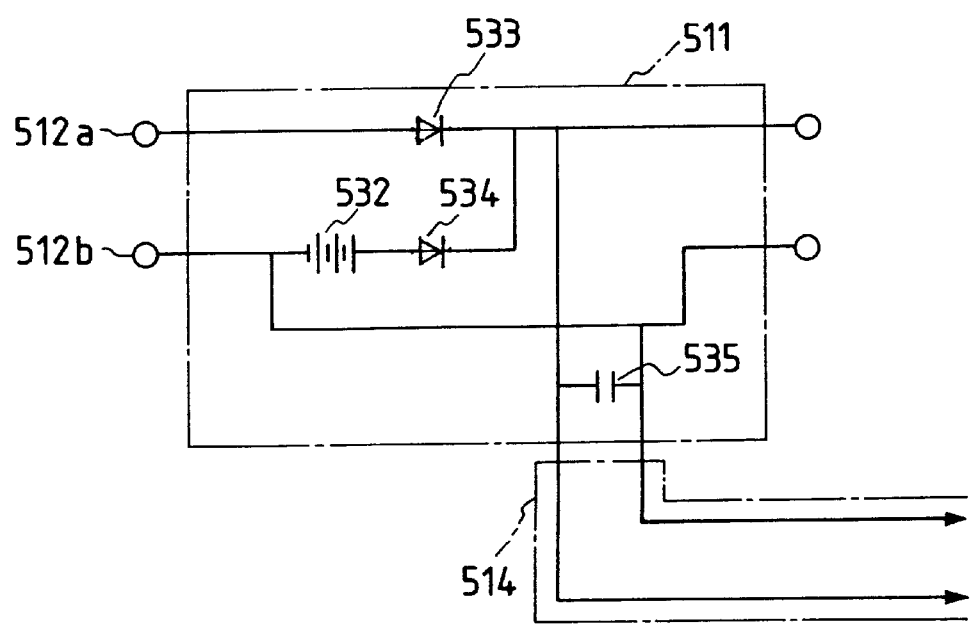
FIG. 15 is a circuit diagram showing the construction of the interior of a distribution adapter in a fifth embodiment of the present invention.

FIG. 15 is a circuit diagram showing the interior of a distribution adapter 511 in a fifth embodiment of the present invention. This embodiment differs from the fourth embodiment of FIG. 14 only in that storage battery means for extension is disposed within the distribution unit 511, and is entirely the same as the fourth embodiment in the other points and therefore, need not be described in detail.

In FIG. 15, the reference characters 512*a* and 512*b* designate contacts for taking out electric power from the separate type power source unit 508 as previously described. Here, let it tentatively be assumed that the contact 512*a* is the high potential side and the contact 512*b* is the low potential side. The reference numeral 532 denotes storage battery means according to the present embodiment which is parallel-connected to the separate type power source unit 508. The reference numerals 533 and 534 designate backflow preventing diodes which perform the function of supplying electric power from one of the separate type power source unit 508 and the storage battery means 532 which is higher in voltage, and preventing the movement of electric current between the two. The reference numeral 535 denotes a capacitor for eliminating the influence of source voltage fluctuation.

By the above-desribed construction, one of the electric power supplied to the contacts 512*a* and 512*b* and the electric power supplied from the storage battery means 532 inherently possessed by the distribution unit 511 which is more surplus is delivered as a power source to the contacts 510*a* and 510*b* of the photographing apparatus 505 and is also delivered as a power source to the image stabilizing adapter device 315 through the parallel-connected power transmission cable 514.

By the storage battery means 532 being thus disposed within the distribution unit 511, use can be made of not only the electric power of the separate type power source unit 508, but also great electric power provided by the electric power of the storage battery means 532 added thereto, and this not only makes long-time photographing possible, but also makes the uniform use of the two electric power sources possible as compared with a case where the storage battery means 532 is exclusively used for the image stabilizing adapter device 515, and the timings which are the limits of use of the photographing apparatus 505 and the image stabilizing adapter device 515 can be made coincident with each other and thus, the electric power sources can be efficiently utilized. Generally, a charging battery or the like is used as the storage battery means, but here is not shown a circuit for charging.

As described above, according to the above-described embodiments, the standby state and image recording state of the camera are made detectable from outside the camera without any change or load being imparted to the video camera side, and the starting and stoppage of the image stabilizing adapter are controlled on the basis of the detection information, whereby the image stabilizing function can be performed without the photographer being forced to perform any cumbersome operation, and in the other cases than necessary, the image stabilizing device does not operate wastefully and thus, the saving of the electric power source can be achieved and its effectiveness is very high.

Further, the separate type power source unit mounted on the camera by means of the distribution adapter is connected to the camera and the image stabilizing adapter so that power supply can be accomplished, and this leads to the possibility of achieving light weight and compactness as well as the possibility of effectively utilizing the power source.

We claim:

1. An apparatus used for an image shake prevention device, comprising:
    determination portion which determines an output of an image shake detection device which detects an image shake; and
    restriction portion which restricts an image shake prevention operation of said image shake prevention device in accordance with a determination of said determination portion, wherein
    said restriction portion restricts the image shake prevention operation of said image shake prevention device when said image shake prevention device is performing the image shake prevention operation in accordance with the output of said image shake detection device and said determination portion judges that the output of said image shake detection device is smaller than a predetermined level.

2. An apparatus according to claim 1, wherein said restriction portion includes means for stopping the image shake prevention operation.

3. An apparatus according to claim 1, further comprising release means for releasing the restriction by said restriction portion when said determination portion determines a state in which the output is larger than a predetermined value.

4. An apparatus according to claim 1, further comprising release means for releasing the restriction by said restriction portion when said determination portion determines a state in which the output is larger than a predetermined value and continues for a predetermined time period.

5. An apparatus according to claim 1, wherein said restriction portion includes means for regulating the image shake prevention operation corresponding to the output of the image shake detection device of the image shake prevention device.

6. An apparatus according to claim 1, wherein the image shake prevention device includes an image shake correction device for correcting the image shake.

7. An apparatus according to claim 1, wherein the image shake prevention device includes means for optically preventing the image shake.

8. An apparatus according to claim 1, wherein the image shake detection device includes means for detecting a fluctuation of an equipment to which the image shake prevention device performs the image shake prevention.

9. An apparatus used for image shake correction apparatus which includes an image shake detection device which detects an image shake and an image shake correction device which operates in accordance with an output of said image shake detection device, said image shake detection device being initiated to drive prior to an initiation of said image shake correction appararus, said apparatus comprising:
    determination portion which determines that an output of said image shake detection device is larger than a predetermined value; and
    a control portion which determines whether said image shake correction apparatus should be activated in accordance with the judgment of said determination means portion under the state that said image shake detection device is being activated but said image shake correction device has not yet been activated in accordance with an output of said image shake detection device.

10. An apparatus according to claim 9, wherein said control portion includes means for starting an image shake prevention operation corresponding to the output of the image shake detection device of the image shake correction apparatus.

11. An apparatus according to claim 10, wherein the image shake correction apparatus includes means for optically preventing the image shake.

12. An apparatus according to claim 9, further comprising a restriction means for regulating the image shake correction apparatus operation corresponding to the output of the image shake detection device of the image shake prevention device.

13. An apparatus according to claim 9, wherein the image shake correction apparatus includes the image shake correction device for correcting the image shake.

14. An apparatus according to claim 9, wherein the predetermined value is larger than an output at a minimum image shake which said image shake detection device could detect.

15. An image shake prevention apparatus comprising:
    an image shake prevention device for preventing an image shake;
    determination portion which determines an output of an image shake detection device which detects an image shake; and
    restriction portion which restricts an image shake prevention operation of said image shake prevention device in accordance with a determination of said determination portion, wherein
    said restriction portion restricts the image shake prevention operation of said image shake prevention device when said image shake prevention device is performing the image shake prevention operation in accordance with the output of said image shake detection device and said determination portion judges that the output of said image shake detection device is smaller than a predetermined level.

16. An optical equipment to which an image shake prevention device performs an image shake prevention, comprising:
- determination portion which determines an output of an image shake detection device which detects an image shake; and
- restriction portion which restricts an image shake prevention operation of said image shake prevention device in accordance with a determination of said determination portion, wherein
  - said restriction portion restricts the image shake prevention operation of said image shake prevention device when said image shake prevention device is performing the image shake prevention operation in accordance with the output of said image shake detection device and said determination portion judges that the output of said image shake detection device is smaller than a predetermined level.

17. An image shake correction apparatus comprising:
- an image shake correction device for correcting an image shake;
- determination portion which determines that an output of an image shake detection device which detects an image shake is larger than a predetermined value; and
- a control portion which determines whether said image shake correction device should be activated in accordance with the judgment of said determination portion under the state that said image shake detection device is being activated but said image shake correction device has not yet been activated in accordance with an output of said image shake detection device.

18. An optical equipment to which an image shake correction device performs an image shake correction, comprising:
- determination portion which determines that an output of an image shake detection device which detects an image shake is larger than a predetermined value; and
- a control portion which determines whether said image shake correction device should be activated in accordance with the judgment of said determination portion under the state that said image shake detection device is being activated but said image shake correction device has not yet been activated in accordance with an output of said image shake detection device.

19. An apparatus used for image shake correction system which includes an image shake detection device which detects an image shake and an image shake correction device which performs a predetermined image shake correction operation in accordance with an output of said image shake detection device, said apparatus comprising:
- determination portion which determines that an output of said image shake detection device is larger than a predetermined value; and
- a control portion which starts the predetermined image shake correction operation of said image shake correction device in accordance with the judgment of said determination portion under the state that said image shake detection device is being activated but said image shake correction device does not perform the predetermined image shake correction operation in accordance with an output of said image shake detection device.

20. An apparatus according to claim 19, wherein said determination portion includes means for performing the judgment of said determination portion in accordance with a signal which corresponds to the output of said image shake detection device and a value of which represents a displacement.

21. An apparatus according to claim 19, wherein said image shake detection device includes means for detecting a shake of the apparatus.

22. An apparatus according to claim 19, wherein said image shake correction device includes means for optically correcting the image shake.

23. An apparatus according to claim 22, wherein said image shake correction device includes means for correcting the image shake by bending a light ray.

24. An image shake correction apparatus comprising:
- an image shake correction device for correcting an image shake;
- determination portion which determines that an output of an image shake detection device is larger than a predetermined value; and
- a control portion which starts a predetermined image shake correction operation of said image shake correction device in accordance with the judgment of said determination portion under the state that said image shake detection device is being activated but said image shake correction device does not perform the predetermined image shake correction operation in accordance with an output of said image shake detection device.

25. An optical equipment to which an image shake correction device performs an image shake correction comprising:
- determination portion which determines that an output of an image shake detection device is larger than a predetermined value; and
- a control portion which starts a predetermined image shake correction operation of said image shake correction device in accordance with the judgment of said determination portion under the state that said image shake detection device is being activate but said image shake correction device does not perform the predetermined image shake correction operation in accordance with an output of said image shake detection device.

* * * * *

UNITED STATES PATENT AND TRADEMARK OFFICE
CERTIFICATE OF CORRECTION

PATENT NO. : 6,191,813 B1
DATED : February 20, 2001
INVENTOR(S) : Tatsuo Fujisaki It is certified that error appears in the above-identified patent and that said Letters Patent is hereby corrected as shown below:

Column 3,
Line 52, delete "startfinish" and insert -- start-finish --.

Column 4,
Line 59, delete "of.angular" and insert -- of angular --.

Column 10,
Line 24, delete "Further,.at" and insert -- Further, at --.
Line 67, delete "(+VC–VC) and insert -- (+VC- -VC) --.

Column 16,
Line 50, delete "activate" and insert -- activated --.

Signed and Sealed this

Nineteenth Day of March, 2002

Attest:

JAMES E. ROGAN
*Director of the United States Patent and Trademark Office*

*Attesting Officer*